US008153713B2

(12) United States Patent
Mohite et al.

(10) Patent No.: US 8,153,713 B2
(45) Date of Patent: Apr. 10, 2012

(54) CORE-SHELL PARTICLE, METHOD, AND COMPOSITION

(75) Inventors: Amol Adhikrao Mohite, Bangalore (IN); Jaykisor Pal, West Bengal (IN); Sathya Narayanan, Bangalore (IN); Satishkumar H. Mahanth, Mysore (IN); Albin Peter Berzinis, Delmar, NY (US); Shripathy Vilasagar, Parkersburg, WV (US)

(73) Assignee: Sabic Innovative Plastics IP B.V. (NL)

( * ) Notice: Subject to any disclaimer, the term of this patent is extended or adjusted under 35 U.S.C. 154(b) by 715 days.

(21) Appl. No.: 12/266,968

(22) Filed: Nov. 7, 2008

(65) Prior Publication Data

US 2009/0214868 A1 Aug. 27, 2009

Related U.S. Application Data

(60) Provisional application No. 61/031,087, filed on Feb. 25, 2008.

(51) Int. Cl.
*C08K 5/5419* (2006.01)
*C08G 77/442* (2006.01)

(52) U.S. Cl. ........ 524/266; 524/268; 525/100; 525/105; 525/106; 525/431; 525/446; 528/25; 528/32; 528/34; 528/37; 528/38

(58) Field of Classification Search ......................... None
See application file for complete search history.

(56) References Cited

U.S. PATENT DOCUMENTS

| | | | |
|---|---|---|---|
| 3,220,972 A | 11/1965 | Lamoreaux | |
| 4,812,515 A | 3/1989 | Kress et al. | |
| 5,045,595 A | 9/1991 | Wang | |
| 5,079,293 A * | 1/1992 | Alsamarraie et al. | 525/66 |
| 5,200,465 A | 4/1993 | Hellstern et al. | |
| 5,258,450 A * | 11/1993 | Nakata et al. | 524/588 |
| 7,015,261 B1 | 3/2006 | Zerafati et al. | |
| 7,153,899 B2 | 12/2006 | Reddy et al. | |
| 2002/0147271 A1* | 10/2002 | Craig et al. | 524/837 |
| 2006/0089456 A1 | 4/2006 | Lee et al. | |
| 2006/0148946 A1 | 7/2006 | Lee et al. | |
| 2007/0021557 A1 | 1/2007 | Lee et al. | |
| 2007/0213474 A1* | 9/2007 | Ebenhoch et al. | 525/479 |

FOREIGN PATENT DOCUMENTS

| | | |
|---|---|---|
| EP | 0249964 A2 | 12/1987 |
| EP | 369204 A2 | 5/1990 |
| EP | 1207172 A2 | 5/2002 |
| EP | 1676871 A1 | 7/2006 |
| JP | 2002-275486 A * | 9/2002 |
| WO | WO 2005/108449 | * 11/2005 |

OTHER PUBLICATIONS

"A Novel Method for Preparing Compostites of PDMS/PS Core-Shell Emulsion and Polystyrene" authored by Hu et al. and published in the Journal of Applied Polymer Science (2007) 105, 2571-2576.*

Jan. 15, 2010 Restriction Requirement and Non-Final Office Action for U.S. Appl. No. 12/266,784, 59 pages.
Gu et al., Preparation of silica-polystyrene core-shell particles up to micron sizes, Journal of Colloid and Interface Science 272 (2004) 314-320.
Chunling Hu et al., A novel method for preparing composites of PDMS/PS core-shell emulsion and polystyrene, Journal of Applied Polymer Science, Sep. 5, 2007, vol. 105, Issue 5, pp. 2571-2576, ISSN 0021-8995, Abstract, 2 pages.
Katharina Landfester et al., Polydimethylsiloxane latexes and copolymers by polymerization and polyaddition in miniemulsion Polymer, vol. 46, Issue 23, Nov. 14, 2005, pp. 9892-9898, Abstract, 2 pages.
Mingxuan Zou et al., Preparation and characterization of core-shell polystyrene-polydimethylsiloxane particles by seeded polymerization, Polymer International, Published online Jun. 1, 2004, vol. 53, pp. 1033-1039, ISSN 0007-1641, Abstract, 2 pages.
International Searching Authority, International Search Report, PCT/US2009/034843, Date of Mailing: Oct. 12, 2009, 4 pages.
International Searching Authority, Written Opinion, PCT/US2009/034843, Date Mailed: Oct. 12, 2009, 5 pages.
International Search Report and the Written Opinion of the International Authority; International Application No. PCT/IB2009/050727; International Filing Date Feb. 23, 2009; Date of Mailing Feb. 7, 2009; 14 pages.
J.C. Saam and D.J. Huebner, "Anionic emulsions of high molecular weight polydimethylsiloxane", 3rd Int. Conf. Surf. Colloid Sci., 1979, 166.
Warrick et al., "Silicone Elastomer Developments 1967-1977", Rubber Chemistry and Technology, vol. 52, p. 437-525, 1979.
J.C. Saam and D.J. Huebner, "Condensation Polymerization of Oligomeric Polydimethylsiloxanols in Aqueous Emulsion", Journal of Polymer Science, Polymer Chemistry Edition, vol. 20, pp. 3351-3368, 1982.
D.W. McCarthy and J.E. Mark, "Poly(dimethylsiloxane) elastomers from aqueous emulsions: I. Preparations, and characterization of the curing and aging processes" Rubber Chemistry and Technology, vol. 71, p. 906-927, 1998.
D.W. McCarthy and J.E. Mark, "Poly(dimethylsiloxane) elastomers from aqueous emulsions: III. Effects of blended silica fillers and γ-radiation-induced crosslinking", Rubber Chemistry and Technology, vol. 71, p. 941-948, 1998.
K. Landfester, "Polyreactions in Miniemulsions", Macromol. Rapid Commun., vol. 22, pp. 896-936, 2001.
Jiang Zhang and J. Yang, J. Appl. Polym. Sci., vol. 89, pp. 3587-3593, 2003 "Microemulsion polymerization of siloxane with nonionic surfactants as emulsifiers".
ISO 1133, Plastics Determination of the melt mass-flow rate (MFR) and the melt volume-flow rate (MVR) of thermoplastics.
UL 94, Tests for Flammability of Plastic Materials for Parts in Devices and Appliances.

(Continued)

*Primary Examiner* — Marc Zimmer
(74) *Attorney, Agent, or Firm* — Cantor Colburn LLP

(57) ABSTRACT

A core-shell particle is formed by a method that includes forming a crosslinked polyorganosiloxane core, reacting a graftlinking agent with the crosslinked polyorganosiloxane core, and polymerizing a poly(alkenyl aromatic) shell around the graftlinking agent-functionalized polyorganosiloxane core. The method produces a core-shell particle with improved adhesion between shell and core. The core-shell particle is useful as an impact modifier in thermoplastic compositions.

40 Claims, No Drawings

OTHER PUBLICATIONS

ASTM D 648-06, Standard Test Method for Deflection Temperature of Plastics Under Flexural Load in the Edgewise Position.

ISO 6603-2, Plastics Determination of puncture impact behaviour of rigid plastics, Part 2: Instrumented impact testing, Oct. 1, 2000.

Joncryl ADR-4368, Jan. 25, 2008, 8 pages.

Encyclopedia of Polymer Science and Engineering, Scattering to Structural Foams, vol. 15, 5 pages, (Feb. 1989).

U.S. Appl. No. 61/031,080, filed Feb. 25, 2008.

U.S. Appl. No. 61/031,087, filed Feb. 25, 2008.

* cited by examiner

CORE-SHELL PARTICLE, METHOD, AND COMPOSITION

CROSS REFERENCE TO RELATED APPLICATION

This application claims the benefit of U.S. Provisional Patent Application Ser. No. 61/031,087 filed Feb. 25, 2008, which is fully incorporated herein by reference.

BACKGROUND OF THE INVENTION

Core-shell particles having a crosslinked elastomeric core and a thermoplastic shell are known. Such particles are particularly useful when blended with thermoplastics to decrease their brittleness. One class of known core-shell particles includes a crosslinked polyorganosiloxane (silicone) core and a vinyl polymer shell. These silicone impact modifier (SIM) particles have been evaluated as impact modifiers for various thermoplastics, but their utility is limited by apparently poor bonding between the particles' cores and shells. There is therefore a need for new methods of preparing SIM particles that provide improved bonding between core and shell.

BRIEF DESCRIPTION OF THE INVENTION

The above-described and other drawbacks are alleviated by a method of forming a core-shell particle, comprising: forming a polyorganosiloxane core by polymerizing a polydialkylsiloxane precursor in the presence of water and a first emulsifying agent; crosslinking the polyorganosiloxane core by reacting a tri- or tetraalkoxysilane with the polyorganosiloxane core; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer in the presence of the graftlinker-functionalized crosslinked polysiloxane core and a second emulsifying agent; wherein the shell-forming monomer comprises an alkenyl aromatic compound.

Another embodiment is a core-shell particle comprising: a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C.

Another embodiment is a thermoplastic composition, comprising: a polymer; and a core-shell particle, comprising a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C.

These and other embodiments are described in detail below.

DETAILED DESCRIPTION OF THE INVENTION

The present inventors have discovered that particles with improved core-shell adhesion can be formed by a method of forming a core-shell particle, comprising: forming a polyorganosiloxane core by polymerizing a polydialkylsiloxane precursor in the presence of water and a first emulsifying agent; crosslinking the polyorganosiloxane core by reacting a tri- or tetraalkoxysilane with the polyorganosiloxane core; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer in the presence of the graftlinker-functionalized crosslinked polysiloxane core and a second emulsifying agent; wherein the shell-forming monomer comprises an alkenyl aromatic compound. The improvement in core-shell adhesion is manifested as higher gel content (lower weight percent dissolved) when the particles are immersed in toluene for two days.

The core-shell particles are particularly useful as elastomers to improve the impact strength of thermoplastic compositions. In some embodiments, the core-shell particles are superior to conventional elastomers in the improvements in impact strength provided to thermoplastic compositions. In some embodiments, the core-shell particles also reduce the smoke density generated on combustion of thermoplastic compositions.

As mentioned above, one embodiment is a method of forming a core-shell particle, comprising: forming a polyorganosiloxane core by polymerizing a polydialkylsiloxane precursor in the presence of water and a first emulsifying agent; crosslinking the polyorganosiloxane core by reacting a tri- or tetraalkoxysilane with the polyorganosiloxane core; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer in the presence of the graftlinker-functionalized crosslinked polysiloxane core and a second emulsifying agent; wherein the shell-forming monomer comprises an alkenyl aromatic compound.

The polydialkylsiloxane precursor used in the first step is typically a cyclic dimethylsiloxane oligomer comprising 4 to 12 dimethylsiloxane units. Illustrative examples of such oligomers include octamethylcyclotetrasiloxane ("D4") and eicosamethylcyclodecasiloxane ("D10"). In some embodiments, the polydialkylsiloxane precursor comprises octamethylcyclotetrasiloxane (D4). The polydialkylsiloxane precursor is typically used in an amount of about 50 to 90 weight percent based on the total weight of the polydialkylsiloxane precursor, the tri- or tetraalkoxysilane, the graftlinking agent, and the shell-forming monomer.

The amount of water used in the polyorganosiloxane core-forming step is typically 40 to 90 weight percent based on the total weight of the polydialkylsiloxane precursor, the tri- or tetraalkoxysilane, the graftlinking agent, the shell-forming monomer, and the water.

The polyorganosiloxane core-forming step utilizes a first emulsifying agent. A particularly useful first emulsifying agent comprises dodecylbenzenesulfonic acid, but other emulsifying agents can be used. While not wishing to be bound by any particular mechanistic hypothesis, the present inventors speculate that dodecylbenzenesulfonic acid functions as both an emulsifying agent and a polymerization catalyst. The amount of the first emulsifying agent is typically 0.5 to 1.5 weight percent based on the total weight of the water and the polydialkylsiloxane precursor.

In some embodiments, the polymerizing a polydialkylsiloxane precursor is conducted in the absence of a tri- or tetraalkoxysilane. In some embodiments, the polymerizing a polydialkylsiloxane precursor is conducted in the absence of a graftlinking agent.

After forming the polyorganosiloxane core, the method comprises the step of crosslinking the polyorganosiloxane core by reacting a tri- or tetraalkoxysilane with the polyorganosiloxane core. Illustrative examples of trialkoxysilanes include methyltrimethoxysilane (CAS Reg. No. 1185-55-3), methyltriethoxysilane (2031-67-6), and mixtures thereof. Illustrative examples of tetraalkoxysilanes include tetraethoxysilane ("tetraethyl orthosilicate"; 78-10-4), tetramethoxysilane (681-84-5), tetrapropoxysilane (682-01-9), and mixtures thereof. In some embodiments, the tri- or tetraalkoxysilane comprises tetraethyl orthosilicate. The tri- or tetraalkoxysilane is typically used in an amount of 2 to 30 weight percent based on the total weight of the polydialkylsiloxane precursor, and the tri- or tetraalkoxysilane.

In some embodiments, crosslinking the polyorganosiloxane core is conducted in the absence of a graftlinking agent.

After the step of crosslinking the polyorganosiloxane core, the method comprises the step of forming a graftlinker-functionalized crosslinked polyorganosiloxane core by reacting the crosslinked polyorganosiloxane core with a graftlinking agent comprising an alkoxysilane group and an aliphatic carbon-carbon double or triple bond. This step is conveniently conducted without intermediate isolation of the crosslinked polyorganosiloxane core. Specific graftlinking agents that can be employed in this step include, for example, methacryloxypropyltrimethoxysilane (CAS Reg. No. 2530-85-0), methacryloxypropyltriethoxysilane (21142-29-0), methacryloxypropylmethyldimethoxysilane (14513-34-9), 3-mercaptopropyltrimethoxysilane (4420-74-0), vinyltrimethoxysilane (2768-02-7), vinyltriethoxysilane (78-08-0), vinyltris(2-methoxyethoxy)silane (1067-53-4), and mixtures thereof. In some embodiments, the graftlinking agent comprises methacryloxypropyltrimethoxysilane. The formation of the graftlinker-functionalized crosslinked polyorganosiloxane core can, optionally, be conducted in the absence of a polydialkylsiloxane precursor and a tri- or tetraalkoxysilane. The graftlinking agent is typically used in an amount of 1 to 7.5 weight percent based on the total weight of the polydialkylsiloxane precursor, the tri- or tetraalkoxysilane, the graftlinking agent, and the shell-forming monomer.

After the step of forming a graftlinker-functionalized crosslinked polyorganosiloxane core, the method comprises the step of forming a core-shell particle by polymerizing a shell-forming monomer in the presence of the graftlinker-functionalized crosslinked polysiloxane core and a second emulsifying agent; wherein the shell-forming monomer comprises an alkenyl aromatic compound. The alkenyl aromatic compound can have the structure

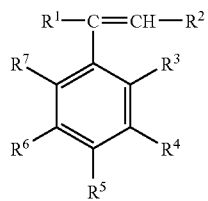

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group, or $R^4$ and $R^5$ are taken together with the central aromatic ring to form a naphthyl group. Specific alkenyl aromatic compounds include, for example, styrene and methylstyrenes such as alpha-methylstyrene and p-methylstyrene. In some embodiments, the alkenyl aromatic compound is styrene.

In addition to the alkenyl aromatic monomer, the shell-forming monomer can comprise other monomers copolymerizable with the alkenyl aromatic compound. Illustrative other monomers include alkyl acrylate monomers (such as, for example, methyl methacrylate, ethyl acrylate, and butyl acrylate), acrylonitrile, methacrylonitrile, and mixtures thereof.

In some embodiments, the shell-forming monomer further comprises a functionalized monomer comprising a carbon-carbon double or triple bond and at least one other functional group selected from the group consisting of hydroxy, glycidyl, and nitrile. Specific functionalized monomers include, for example, glycidyl methacrylate, 2-hydroxyethyl methacrylate, acrylonitrile, and mixtures thereof. In some embodiments, the functionalized monomer comprises glycidyl methacrylate. In some embodiments, the functionalized monomer comprises glycidyl methacrylate.

The shell-forming monomer is typically used in an amount of 10 to 50 weight percent based on the total weight of the polydialkylsiloxane precursor, the tri- or tetraalkoxysilane, the graftlinking agent, and the shell-forming monomer.

Polymerizing a shell-forming monomer is conducted in the presence of a second emulsifying agent. In some embodiments, the second emulsifying agent comprises sodium dodecylbenzenesulfonate. The second emulsifying agent is typically used in an amount of 0.2 to 5 weight percent, specifically 0.5 to 3 weight percent, based on the weight of the shell-forming monomer. Alternatively, the amount of the second emulsifying agent can be expressed as 0.2 to 2.5 weight percent based on the weight of the graftlinker-functionalized crosslinked polyorganosiloxane core.

The mean diameter of the core-shell particle formed by the process will vary according to the process conditions chosen, but it is typically 220 to 300 nanometers. Within this total diameter, the crosslinked core typically has a mean diameter of 200 to 280 nanometers.

One advantage of the method is that is produces core-shell particles having improved adhesion between the core and the shell. This adhesion can be quantified using a gel content test, which measures the solubility of the shell polymer in a solvent that is a good solvent for the shell and a poor solvent for the core. Improved core-shell adhesion is manifested as higher gel content (lower shell solubility). For example, in some embodiments, the core-shell particle has a gel content of 80 to 95 percent, specifically 83 to 94 percent, more specifically 85 to 94 percent, measured after 48 hours immersion in toluene at 23° C. A detailed procedure for gel content measurement is provided in the working examples, below.

In some embodiments, the core-shell particle exhibits a first glass transition temperature of −134 to −124° C. and a second glass transition temperature of 103 to 113° C., measured by differential scanning calorimetry using a rate of temperature change of 20° C. per minute.

In some embodiments, the core-shell particle exhibits at least 90 weight percent residue, specifically 90 to 99 weight percent residue, more specifically 95 to 98 weight percent residue at 300° C. and at least 10 weight percent residue, specifically 10 to 30 weight percent residue, more specifically 10 to 20 weight percent residue at 600° C. when analyzed by thermogravimetric analysis using an air atmosphere and a rate of temperature change of 20° C. per minute. The residue at 600° C. corresponds to char that is useful in flame retardancy.

In some embodiments of the method, the polydialkylsiloxane precursor comprises octamethylcyclotetrasiloxane; the tri- or tetraalkoxysilane comprises tetraethyl orthosilicate; the first emulsifying agent comprises dodecylbenzenesulfonic acid; the graftlinking agent comprises methacryloxypropyltrimethoxysilane; the alkenyl aromatic compound comprises styrene; the core-shell particle has a mean diameter of 220 to 300 nanometers; and the core-shell particle has a gel content of 85 to 95 percent measured after 48 hours immersion in toluene at 23° C. In some embodiments, the polymerizing a shell-forming monomer comprises copolymerizing styrene and glycidyl methacrylate.

Another embodiment is a core-shell particle, comprising: a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C. In some embodiments, the crosslinked polydimethylsiloxane core has a mean diameter of 200 to 280 nanometers.

In some embodiments of the core-shell particle, the crosslinked polydimethylsiloxane is the product of copolymerizing reactants comprising octamethylcyclotetrasiloxane and tetraethyl orthosilicate; the core-shell particle has a mean diameter of 240 to 270 nanometers; the shell is a homopolymer of styrene or a copolymer of styrene and glycidyl methacrylate; the covalent linkages are reaction products of a graftlinking agent comprising methacryloxypropyltrimethoxysilane; and the core-shell particle has a gel content of 85 to 95 percent measured after 48 hours immersion in toluene at 23° C.

Another embodiment is a thermoplastic composition, comprising: a polymer; and a core-shell particle, comprising a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C. Polymers that can be used in the thermoplastic composition include, for example, poly(arylene ether)s, polystyrenes, rubber-modified polystyrenes, unhydrogenated or hydrogenated block copolymers of an alkenyl aromatic compound and a conjugated diene, polyamides, polyimides, polyethers, polyetherimides, polyolefins, and polyesters.

In some embodiments, the polymer comprises a poly(arylene ether). Suitable poly(arylene ether)s include those comprising repeating structural units having the formula

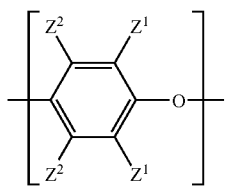

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

In some embodiments, the poly(arylene ether) has an intrinsic viscosity of 0.1 to 1 deciliter per gram measured at 25° C. in chloroform. Specifically, the poly(arylene ether) intrinsic viscosity may be 0.2 to 0.8 deciliter per gram, more specifically 0.3 to 0.6 deciliter per gram, still more specifically 0.4 to 0.5 deciliter per gram.

In some embodiments, the polymer comprises a poly(arylene ether) and at least one additional polymer selected from the group consisting of polystyrenes, rubber-modified polystyrenes, unhydrogenated or hydrogenated block copolymers of an alkenyl aromatic compound and a conjugated diene, polyamides, polyimides, polyethers, polyetherimides, polyolefins, and polyesters.

In some embodiments, the crosslinked polydimethylsiloxane core has a mean diameter of 200 to 280 nanometers.

In the thermoplastic composition, the amount of the polymer can be 50 to 99.5 weight percent, specifically 60 to 95 weight percent, more specifically 70 to 90 weight percent, based on the total weight of the thermoplastic composition. And the amount of the core-shell particle can be 0.5 to 50 weight percent, specifically 5 to 40 weight percent, more specifically 5 to 30 weight percent, still more specifically 5 to 20 weight percent, based on the total weight of the thermoplastic composition.

The invention includes at least the following embodiments.

Embodiment 1: A method of forming a core-shell particle, comprising: forming a polyorganosiloxane core by polymerizing a polydialkylsiloxane precursor in the presence of water and a first emulsifying agent; crosslinking the polyorganosiloxane core by reacting a tri- or tetraalkoxysilane with the polyorganosiloxane core; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer in the presence of the graftlinker-functionalized crosslinked polysiloxane core and a second emulsifying agent; wherein the shell-forming monomer comprises an alkenyl aromatic compound.

Embodiment 2: The method of embodiment 1, wherein the polymerizing a polydialkylsiloxane precursor is conducted in the absence of a tri- or tetraalkoxysilane.

Embodiment 3: The method of embodiment 1 or 2, wherein the polymerizing a polydialkylsiloxane precursor is conducted in the absence of a graftlinking agent.

Embodiment 4: The method of any of embodiments 1-3, wherein the crosslinking the polyorganosiloxane core is conducted in the absence of a graftlinking agent.

Embodiment 5: The method of any of embodiments 1-4, wherein the polydialkylsiloxane precursor comprises a cyclic dimethylsiloxane oligomer or polymer comprising 4 to 12 dimethylsiloxane units.

Embodiment 6: The method of any of embodiments 1-5, wherein the polydialkylsiloxane precursor comprises octamethylcyclotetrasiloxane.

Embodiment 7: The method of any of embodiments 1-6, wherein the polydialkylsiloxane precursor is used in an amount of about 50 to 90 weight percent based on the total weight of the polydialkylsiloxane precursor, the tri- or tetraalkoxysilane, the graftlinking agent, and the shell-forming monomer.

Embodiment 8: The method of any of embodiments 1-7, wherein the first emulsifying agent comprises dodecylbenzenesulfonic acid.

Embodiment 9: The method of any of embodiments 1-8, wherein the first emulsifying agent is used in an amount of 0.5 to 1.5 weight percent based on the total weight of the water and the polydialkylsiloxane precursor.

Embodiment 10: The method of any of embodiments 1-9, wherein the water is used in an amount of 40 to 90 weight percent based on the total weight of the polydialkylsiloxane precursor, the tri- or tetraalkoxysilane, the graftlinking agent, the shell-forming monomer, and the water.

Embodiment 11: The method of any of embodiments 1-10, wherein the tri- or tetraalkoxysilane is selected from the group consisting of tetraethyl orthosilicate, methyltrimethoxysilane, methyltriethoxysilane, tetramethoxysilane, tetrapropoxysilane, and mixtures thereof.

Embodiment 12: The method of any of embodiments 1-11, wherein the tri- or tetraalkoxysilane comprises tetraethyl orthosilicate.

Embodiment 13: The method of any of embodiments 1-12, wherein the tri- or tetraalkoxysilane is used in an amount of 2 to 30 weight percent based on the total weight of the polydialkylsiloxane precursor, and the tri- or tetraalkoxysilane.

Embodiment 14: The method of any of embodiments 1-13, wherein the graftlinking agent is selected from the group consisting of methacryloxypropyltrimethoxysilane, methacryloxypropyltriethoxysilane, methacryloxypropylmethyldimethoxysilane, 3-mercaptopropyltrimethoxysilane, vinyltrimethoxysilane, vinyltriethoxysilane, vinyltris(2-methoxyethoxy)silane, and mixtures thereof.

Embodiment 15: The method of any of embodiments 1-13, wherein the graftlinking agent comprises methacryloxypropyltrimethoxysilane.

Embodiment 16. The method of any of embodiments 1-15, wherein the graftlinking agent is used in an amount of 1 to 7.5 weight percent based on the total weight of the polydialkylsiloxane precursor, the tri- or tetraalkoxysilane, the graftlinking agent, and the shell-forming monomer.

Embodiment 17: The method of any of embodiments 1-16, wherein the alkenyl aromatic monomer comprises styrene.

Embodiment 18: The method of any of embodiments 1-17, wherein the shell forming monomer further comprises an acrylate monomer, acrylonitrile, methacrylonitrile, or a mixture thereof.

Embodiment 19: The method of any of embodiments 1-18, wherein the shell-forming monomer further comprises a functionalized monomer comprising a carbon-carbon double or triple bond and at least one other functional group selected from the group consisting of hydroxy, glycidyl, and nitrile.

Embodiment 20: The method of embodiment 19, wherein the functionalized monomer is selected from the group consisting of glycidyl methacrylate, 2-hydroxyethyl methacrylate, acrylonitrile, and mixtures thereof.

Embodiment 21: The method of embodiment 19, wherein the functionalized monomer comprises glycidyl methacrylate.

Embodiment 22: The method of any of embodiments 1-21, wherein the shell-forming monomer is used in an amount of 10 to 50 weight percent based on the total weight of the polydialkylsiloxane precursor, the tri- or tetraalkoxysilane, the graftlinking agent, and the shell-forming monomer.

Embodiment 23: The method of any of embodiments 1-22, wherein the second emulsifying agent comprises sodium dodecylbenzenesulfonate.

Embodiment 24: The method of any of embodiments 1-23, wherein the second emulsifying agent is used in an amount of 0.2 to 5 weight percent based on the weight of the shell-forming monomer.

Embodiment 25: The method of any of embodiments 1-24, wherein the core-shell particle has a mean diameter of 220 to 300 nanometers.

Embodiment 26: The method of any of embodiments 1-25, wherein the core-shell particle comprises a core having a mean diameter of 200 to 280 nanometers.

Embodiment 27: The method of any of embodiments 1-26, wherein the core-shell particle has a gel content of 80 to 95 percent measured after 48 hours immersion in toluene at 23° C.

Embodiment 28: The method of any of embodiments 1-27, wherein the core-shell particle exhibits a first glass transition temperature of −134 to −124° C. and a second glass transition temperature of 103 to 113° C., measured by differential scanning calorimetry using a rate of temperature change of 20° C. per minute.

Embodiment 29: The method of any of embodiments 1-28, wherein the core-shell particle exhibits at least 90 weight percent residue at 300° C. and at least 10 weight percent residue at 600° C. when analyzed by thermogravimetric analysis using an air atmosphere and a rate of temperature change of 20° C. per minute.

Embodiment 30: The method of embodiment 1, wherein the polydialkylsiloxane precursor comprises octamethylcyclotetrasiloxane; wherein the tri- or tetraalkoxysilane comprises tetraethyl orthosilicate; wherein the first emulsifying agent comprises dodecylbenzenesulfonic acid; wherein the graftlinking agent comprises methacryloxypropyltrimethoxysilane; wherein the alkenyl aromatic compound comprises styrene; wherein the core-shell particle has a mean diameter of 220 to 300 nanometers; and wherein the core-shell particle has a gel content of 85 to 95 percent measured after 48 hours immersion in toluene at 23° C.

Embodiment 31: The method of embodiment 30, wherein the polymerizing a shell-forming monomer comprises copolymerizing styrene and glycidyl methacrylate.

Embodiment 32: A core-shell particle, comprising: a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C.

Embodiment 33: The core-shell particle of embodiment 32, wherein the crosslinked polydimethylsiloxane core has a mean diameter of 200 to 280 nanometers.

Embodiment 34: The core-shell particle of embodiment 32, wherein the crosslinked polydimethylsiloxane is the product of copolymerizing reactants comprising octamethylcyclotetrasiloxane and tetraethyl orthosilicate; wherein the core-shell particle has a mean diameter of 240 to 270 nanometers; wherein the shell is a homopolymer of styrene or a copolymer of styrene and glycidyl methacrylate; wherein the covalent linkages are reaction products of a graftlinking agent comprising methacryloxypropyltrimethoxysilane; and wherein the core-shell particle has a gel content of 85 to 95 percent measured after 48 hours immersion in toluene at 23° C.

Embodiment 35: A thermoplastic composition, comprising: a polymer; and a core-shell particle, comprising a crosslinked polydimethylsiloxane core; a shell comprising a styrene homopolymer or copolymer; and covalent linkages between the crosslinked polydimethylsiloxane core and the shell; wherein the core-shell particle has a mean diameter of 220 to 300 nanometers; and wherein the core-shell particle has a gel content of 80 to 95 percent measured after 48 hours immersion in toluene at 23° C.

Embodiment 36: The thermoplastic composition of embodiment 35, wherein the crosslinked polydimethylsiloxane core has a mean diameter of 200 to 280 nanometers.

Embodiment 37: The thermoplastic composition of embodiment 35, comprising 5 to 20 weight percent of the core-shell particle, based on the total weight of the composition.

Embodiment 38: The thermoplastic composition of embodiment 35, wherein the polymer comprises a poly(arylene ether).

Embodiment 39: The thermoplastic composition of embodiment 35, wherein the polymer comprises a poly(arylene ether) and at least one additional polymer selected from the group consisting of polystyrenes, rubber-modified polystyrenes, unhydrogenated or hydrogenated block copolymers of an alkenyl aromatic compound and a conjugated diene, polyamides, polyimides, polyethers, polyetherimides, polyolefins, and polyesters.

The invention is further illustrated by the following non-limiting examples.

Example 1

Reactants used to form the silicone impact modifiers are listed in Table 1.

TABLE 1

| Name or Abbreviation | Description |
|---|---|
| D4 | Octamethylcyclotetrasiloxane, CAS Reg. No. 556-67-2; obtained from Momentive Performance Materials |
| TEOS | Tetraethyl orthosilicate, CAS Reg. No. 78-10-4; obtained from Aldrich with nominal 98% purity |
| MPTMS | Methacryloxypropyltrimethoxysilane, CAS Reg. No. 2530-85-0; obtained from Gelest |
| MePTMS | Mercaptopropyltrimethoxysilane, CAS Reg. No. 4420-74-0; obtained from Sigma-Aldrich |
| Styrene | Styrene, CAS Reg. No. 78-10-4; obtained from Sigma-Aldrich with nominal 99+% purity |
| DVB | Divinylbenzene (mixture of isomers), CAS Reg. No. 1321-74-0; obtained from Sigma-Aldrich |
| DBSA | Dodecylbenzenesulfonic acid, CAS Reg. No. 27176-87-0; obtained from Fluka as a mixture of isomers having a nominal purity of ca. 90% |
| SDBSA | Sodium dodecylbenzenesulfonate, CAS Reg. No. 25155-30-0; obtained from Fluka as a mixture of homologous alkylbenzenesulfonates having a nominal purity of ca. 80% |
| PPS | Potassium persulfate, CAS Reg. No. 7727-21-1; obtained from S.D. Fine Chemicals with nominal 98% purity |
| SBC | Sodium bicarbonate, CAS Reg. No. 144-55-8; obtained from Ranbaxy Fine Chemicals, RANKEM grade |
| Sodium carbonate | Sodium carbonate, CAS Reg. No. 497-19-8; obtained from Thomas Baker |
| Calcium chloride | Calcium chloride, CAS Reg. No. 10043-52-4; obtained from Merck with nominal 98% purity |
| GMA | Glycidyl methacrylate, CAS Reg. No. 106-91-2; obtained from Aldrich |

The overall process for this example can be divided in steps (A) to (D).

Step (A): Polydialkylsiloxane Particle Formation

Polymerization of D4 was carried out in a 12-liter, four-necked reactor equipped with a reflux condenser, electrical oil heater with heat sensor, overhead stirrer, stainless steel stirring rod, nitrogen gas inlet, and monomer addition pump. Emulsion polymerization was carried out with the ingredients as listed in Table 2. The reactor was initially charged with a solution of surfactant (DBSA, 0.7 grams) in distilled water (1500 grams). A pre-emulsion of D4 was made by stirring water (1000 grams), D4 (3200 grams), and DBSA (29 grams) at 1200-1400 rotations per minute (rpm) in a 10-liter plastic vessel. The pre-emulsion was fed to the reactor and maintained at 90° C. continuously for 7 hours. The reaction mixture was continuously stirred at 300 rpm. After complete addition of pre-emulsion, the reaction was continued for 5 additional hours. The reaction mixture was cooled to room temperature and was kept at room temperature for 12 hours (overnight), and the remaining steps were conducted the next day.

TABLE 2

| Ingredients | Initial Charge (g) | Pre-emulsion (g) |
|---|---|---|
| Water | 1500 | 1000 |
| DBSA | 0.7 | 29 |
| D4 | — | 3200 |

Step (B): Polydialkylsiloxane Crosslinking

Step (A) yields an emulsion with high viscosity, so 2,550 grams of water was added to the Step (A) product emulsion to adjust the solids:water weight ratio to 40:60. The reaction mixture was again heated to 90° C. and, to this emulsion, 67 grams TEOS (2 weight percent relative to the total of D4 and TEOS) was added drop-wise. The reaction mixture was maintained at 90° C. for 4 hours after the TEOS addition was complete.

Step (C): Graftlinking Agent Incorporation

To the reaction mixture produced by step (B) was added 101 grams MPTMS (3 weight percent, based on the total of D4, TEOS, and MPTMS) drop-wise with constant stirring at 75° C. The reaction mixture was maintained at 75° C. for another 3 hours. The overall composition of the latex through Step (C) is given in Table 3.

TABLE 3

| Constituents | Solids to Water Ratio |
|---|---|
| Octamethylcyclotetrasiloxane (D4) - 95% - 3200 g | 40% |
| Tetraethyl orthosilicate (TEOS) - 2% - 67 g | |
| Methacryloxypropyltrimethoxysilane (MPTMS) - 3% - 101 g | |
| Dodecylbenzenesulfonic acid (DBSA) - 0.5% - 29.7 g | |
| Water - 5050 g (1500 + 1000 + 2550) | 60% |

Step (D): Shell Synthesis

An amount of 4,500 grams of the silicone latex produced in Step (C) was used for the shell synthesis step. The alkenyl aromatic content used for this step was chosen to produce core-shell particles having 60 weight percent crosslinked polydimethylsiloxane and 40 weight percent poly(alkenyl aromatic). The alkenyl aromatic compound consisted of 99.3 weight percent styrene and 0.7 weight percent divinyl benzene. The divinyl benzene was used to induce branching of polystyrene chains grafted onto the crosslinked polydimethylsiloxane core. The crosslinked polydimethylsiloxane latex obtained from Step (C) was neutralized with 5% aqueous sodium carbonate solution. This was followed by dilution of the latex with water to produce a weight ratio of water:(crosslinked PDMS+styrene+divinyl benzene) of 65:35. The concentrations of potassium persulfate (PPS)+sodium bicarbonate (SBC) were 0.7 weight percent each, based on the concentration of styrene. An additional amount of sodium dodecylbenzenesulfonate (SDBSA), 0.5 weight percent with respect to styrene, was added into the reactor system. The initial composition of the reaction mixture for shell synthesis is given in Table 4.

TABLE 4

| Constituents | Mass (g) | Weight Percent |
|---|---|---|
| Crosslinked Polydimethylsiloxane | 1631 | 35% collectively, based on total weight |
| Styrene | 1087 | |
| Divinyl benzene | 7.6 | |
| Water (present + added) | 5062.4 (2869 + 2193.4) | 65% based on total weight |
| PPS | 7.6 | 0.7% based on styrene |
| SBC | 7.6 | 0.7% based on styrene |
| SDBSA | 5.4 | 0.5% based on styrene, 0.33% based on crosslinked polydimethylsiloxane |

The initiator mixture (PPS and SBC) was added to the reactor containing the silicone latex. The reaction mixture was heated to 75° C. with constant agitation at 300 rpm. Drop-wise addition of combined styrene and divinyl benzene was carried out using dropper funnel for a period of 3 hours. After complete addition of styrene, the reaction mixture was maintained at 75° C. for an additional 5 hours. The latex was then cooled to room temperature and the latex particles were separated from the aqueous phase by coagulation. A 2 weight percent calcium chloride solution in water was charged in a stainless steel vessel at 75° C. with agitation at 700 rpm. The styrene grafted silicone stable latex was poured into the stainless steel vessel containing the salt solution to break the latex and produce a powder. The resultant powder was filtered, washed thoroughly with water, and dried at 65-80° C. for 48 hours.

Example 2

This experiment illustrates additional reinforcement of the crosslinked polydimethylsiloxane core by addition of extra TEOS before incorporation of MPTMS in the core. The reaction was also carried out on a smaller scale than the Example 1 reaction. The procedure was the same as in Example 1. However, an extra amount of TEOS was added after the initial crosslinking reaction with 2% TEOS for 4 hours. Thus, 48 grams of TEOS (15% based on D4) was added as extra TEOS for further reinforcement. The reaction was continued for 6 hours at 65° C. This step was followed by MPTMS incorporation (Step (C)) and shell formation (Step (D)). The composition of the final step of styrene synthesis is given in Table 5. In the final step, Step (D), the solids:water ratio was adjusted to 40:60.

TABLE 5

| Constituents | Mass (g) | Weight Percent |
|---|---|---|
| Crosslinked polydimethylsiloxane | 316.12 | Collectively, 40% based on total weight |
| Styrene | 135.47 | |
| Water (present + added) | 677.3 (533.9 + 143.5) | 60% based on total weight |
| PPS | 0.94 | 0.7% based on styrene |
| SBC | 0.94 | 0.7% based on styrene |
| SDBSA | 1.4 | 1.0% based on styrene |

Example 3

This experiment demonstrates the use of a lower emulsifying agent concentration in the shell-forming step.

The experiment mentioned was carried out with a surfactant concentration of 1.6% based on crosslinked polydimethylsiloxane and 3.75% based on styrene monomer. Otherwise, the general procedure of Example 1 was used. The initial composition for step (D) is given in Table 7.

TABLE 7

| Constituents | Mass (g) | Weight Percent |
|---|---|---|
| Crosslinked polydimethylsiloxane | 242.42 | Collectively 30% based on total weight |
| Styrene | 104.32 | |
| Water (present + added) | 811.41 (473.6 + 337.8) | 70% based on total weight |
| PPS | 0.73 | 0.7% based on styrene |
| SBC | 0.73 | 0.7% based on styrene |
| SDBSA | 3.9 | 1.6% based on crosslinked polydimethylsiloxane |

A comparison of reaction conditions for Examples 1-3 is provided as Table 8. Number average molecular weight ($M_n$) and weight average molecular weight ($M_w$) for the polydimethylsiloxane produced in Step (A) were determined using gel permeation chromatography with polystyrene standards. Particle sizes for the crosslinked Gel content and percent soluble values for the isolated core-shell particles were determined as follows. Ten grams (initial weight) of the core-shell polymer sample was added to a conical flask and 200 milliliters of toluene was added to it. The resulting mixture was well stirred for a few minutes and left without further agitation for 24 hours. After 24 hours, the toluene soluble portion was carefully removed from the gel by filtration. The remaining gel was then dried under vacuum for a minimum 10 hours at 70° C. and the final weight was measured. Gel content and percent soluble values were calculated according to the following equations:

Gel Content(%)=100×(final weight)/(initial weight)

Percent Soluble(%)=100−[100×(final weight)/(initial weight)].

The low percent soluble values for Examples 1-3 indicate good anchorage of the polystyrene or poly(styrene-glycidyl methacrylate) shell to the crosslinked polydimethylsiloxane core. Thermogravimetric analysis in air atmosphere was conducted to determine the stability of the core-shell particles and the amount of char that they produce. The rate of temperature change was 20° C. per minute. The results for Example 3 show that the core-shell particles are stable up to about 300° C. in air, and that they produce char corresponding to about 20% of their original weight when heated to 600° C. This level of char is beneficial for flame retardancy. And the thermal stability of the core-shell particles is superior to that of a polystyrene-poly(ethylene-butylene)-polystyrene impact modifier (Kraton G1650, obtained from Kraton Polymers) in both air and nitrogen atmospheres.

Glass transition temperatures were measured by differential scanning calorimetry (DSC) using a rate of temperature change of 20° C. per minute.

TABLE 8

|  | Ex. 1 | Ex. 2 | Ex. 3 |
|---|---|---|---|
| Reagents | | | |
| Step (A) | | | |
| D4 | 3,200 g | 320 g | 320 g |
| Water | 1,500 + 1,000 g | 150 + 100 g | 150 + 100 g |
| DBSA | 0.7 + 29 g | 0.07 + 2.9 g | 0.07 + 2.9 g |
| Step (B) | | | |
| Water | 2550 g | 255.5 g | 255.5 g |
| TEOS | 67 g | 6.7 + 48 g | 6.7 g |
| Step (C) | | | |
| MPTMS | 54.54* | 10.1 g | 10.1 g |
| Step (D) | | | |
| Graftlinker-functionalized crosslinked polydimethylsiloxane | 1631 g | 316.12 g | 243.2 g |
| Styrene | 1087 g | 135.47 g | 104.3 g |
| DVB | 7.6 g | 0 | 0 |
| Water (present + added) | 2969 + 2193 g | 533.9 + 143.5 g | 473.6 g + 337.8 g |
| PPS | 7.6 g | 0.94 g | 0.73 g |
| SBC | 7.6 g | 0.94 g | 0.73 g |
| SDBSA | 5.4 g | 1.4 g | 3.9 g |
| Temperatures | | | |
| Step (A) | 80-95° C. | 80-95° C. | 80-95° C. |
| Step (B) | 60-90° C. | 60-90° C. | 60-90° C. |
| Step (C) | 70-80° C. | 70-80° C. | 70-80° C. |
| Step (D) | 70-85° C. | 70-85° C. | 70-85° C. |
| Times | | | |
| Step (A) | 5-12 hours | 5-12 hours | 5-12 hours |
| Step (B) | 3-5 hours | 3-5 + 3-5 hours | 3-5 hours |
| Step (C) | 2-4 hours | 2-4 hours | 2-4 hours |
| Step (D) | 4-8 hours | 4-8 hours | 4-8 hours |
| Comments | no coagulation at any step | no coagulation at any step | no coagulation at any step |
| $M_n$ of Step (A) product (g/mol) | — | — | 214,373 |
| $M_w$ of Step (A) product (g/mol) | — | — | 309,522 |
| $M_w/M_n$ for Step (A) product | — | — | 1.44 |
| Mean diameter of crosslinked polydimethylsiloxane (nm) | — | — | 250 |
| Gel Content (%) | 94 | 85 | 83 |
| Percent Solubles (%) | 6 | 15 | 17 |
| TGA - residue at 300° C. | — | — | 98% |
| TGA - residual char at 600° C. | — | — | 20% |
| $T_g$ (° C.) | −129, +108 | — | — |

*In Example 1, 3274.14 g of latex from step (B) was used as the starting material for subsequent steps.

Examples 4 and 5

These experiments were conducted to demonstrate the scalability of the method. Table 9 provides a summary of conditions for two syntheses of core-shell particles with 250 nm diameter cores. A single procedure in a 100 liter reactor was used to form a latex containing crosslinked polydimethylsiloxane cores. Then portions of this latex were used to form core-shell particles, with one of these syntheses being performed in a 12 liter reactor and the other in a 100 liter reactor. The synthetic procedures were generally those of Example 1. The only difference is the solids:water ratio during the shell-forming step. In Example 1, the ratio of solids to water was 40:60 and in this case, but in Examples 4 and 5, the ratio was 30:70. For step (D), the total solids (MPTMS-incorporated crosslinked polydimethylsiloxane+styrene) was adjusted to 30 weight percent.

conversion of D4 of 89.8%. The weight average molecular weight after 7 hours of reaction was about 73,000.

The polydimethylsiloxane emulsion thus obtained was crosslinked in Step (B) using TEOS (3 weight percent based on polydimethylsiloxane). The mean particle size of the crosslinked core was 240 nm.

In Step (C), MPTMS (3 weight percent based on the total of D4, TEOS, and MPTMS) was added to the cross-linked PDMS emulsion, and the reaction was carried out at 75° C. with continuous stirring at 300 rpm for 3 hours.

In Step (D), the styrene content was 30 weight percent based on the total weight of styrene and graftlinker-functionalized crosslinked polydimethylsiloxane. Before styrene addition, the graftlinker-functionalized crosslinked polydimethylsiloxane latex from Step (C) was neutralized with 5% aqueous sodium carbonate solution and diluted with water to give a mixture containing 60 weight percent water. The con-

TABLE 9

|  | Ex. 4 | Ex. 5 |
|---|---|---|
| Reagents | | |
| Step (A) | | |
| D4 | 26,584.22 g | |
| Water | 12,461.3 + 8,307.5 g | |
| DBSA | 5.93 + 243.9 g | |
| Step (B) | | |
| Water | 21,148.28 g | |
| Latex from step (A) | 68,500 g | |
| TEOS | 578.5 g | |
| Step (C) | | |
| Latex from step (B) | 4,000 g | 28,500 g |
| Crosslinked polydimethylsiloxane in latex from step (B) | 1,400 g | 9,975 g |
| MPTMS | 43.3 g | 308.5 g |
| Step (D) | | |
| MPTMS-incorporated crosslinked polydimethylsiloxane | 1,415.2 g | 10,082.9 g |
| Styrene | 606.5 g | 4,321.3 g |
| Water (present + added) | 2,628.1 + 2,089.0 g | 18,725.5 + 14,884.4 g |
| PPS | 4.25 g | 30.3 g |
| SBC | 4.25 g | 30.3 g |
| SDBSA | 22.64 g | 161.3 g |
| Temperatures | | |
| Step (A) | 80-95° C. | 80-95° C. |
| Step (B) | 60-90° C. | 60-90° C. |
| Step (C) | 65-90° C. | 65-90° C. |
| Step (D) | 70-85° C. | 70-85° C. |
| Times | | |
| Step (A) | 5-12 hours | 5-12 hours |
| Step (B) | 3-6 hours | 3-6 hours |
| Step (C) | 2-5 hours | 2-5 hours |
| Step (D) | 4-8 hours | 4-8 hours |
| Gel content (%) | 85.6 | 90.5 |
| Percent solubles (%) | 14.4 | 9.5 |

Example 7

This example demonstrates a reduced reaction time for formation of the crosslinked polydimethylsiloxane core. The general procedure was similar to that of Example 1. However, the reaction time for Step (A) was altered. Instead of 7 hours of addition of pre-emulsion to the reaction mixture, the addition time was reduced to 5 hours, and the reaction was continued for an additional 2 hours to build up the polydimethylsiloxane molecular weight and obtain a percentage centrations of potassium persulfate and sodium bicarbonate were 0.7% each, based on styrene. An additional amount of SDBSA (1.6% with respect to graftlinker-functionalized crosslinked polydimethylsiloxane) was added into the reactor system. The reaction was carried out at 75° C. The styrene was added drop-wise to the reactor containing crosslinked polydimethylsiloxane and initiator. The styrene was added over the course of 3 hours, after which the reaction was continued for 5 hours. At end of reaction, the emulsion was coagulated with calcium chloride solution. The precipitated powder was filtered and dried. The isolated core-shell particles were determined to have a percent solubles of 8.7% (a gel content of 91.3%).

Example 8

In this experiment, the reaction procedure was simplified by adding D4 and an aqueous DBSA solution directly to the reactor, rather than adding the D4 to the reactor in the form of an emulsion in DBSA and water. Satisfactory results were obtained.

Examples 9-11, Comparative Examples 1-9

These examples illustrate the incorporation of the core-shell particles into thermoplastic compositions. Comparative examples using other impact modifiers were also evaluated. The materials used in these examples are summarized in Table 10.

TABLE 10

| Name or Abbreviation | Description |
| --- | --- |
| 0.41 IV PPE | Poly(2,6-dimethyl-1,4-phenylene ether) having intrinsic viscosity of 0.41 dl/g available as PPO 803 from SABIC Innovative Plastics |
| 0.33 IV PPE | Poly(2,6-dimethyl-1,4-phenylene ether) having intrinsic viscosity of 0.33 dl/g available as PPO 808 from SABIC Innovative Plastics |
| PA6 | Polycaprolactam (Polyamide-6; CAS Reg. No. 25038-54-4) having a relative viscosity of 2.40 determined according to DIN 53727 (1.0 wt % solution in 96 wt % sulfuric acid) and commercially available from Rhodia under the trade name TECHNYL HSN 27/32-35 LC Natural. |
| PA66 | Polyamide-6,6 (CAS Reg. No. 32131-17-2) having a 2.66 ml/g relative viscosity determined according to DIN 53727 (1.0 wt % solution in 96 wt % sulfuric acid) and commercially available from Solutia under the trade name VYDYNE 21Z. |
| PBT195 | Polybutylene terephthalate having an intrinsic viscosity of 0.70 dl/g as measured in 1:1 weight to weight mixture of phenol:1,1,2,2-tetrachloroethane at 30° C. available from SABIC Innovative Plastics |
| SEBS G1650 | Polystyrene-poly(ethylene-butylene)-polystyrene triblock copolymer (CAS. Reg. No. 66070-58-4) having a polystyrene content of 30 weight percent, available as KRATON G1650 from Kraton Polymers. |
| SEBS G1651 | Polystyrene-poly(ethylene-butylene)-polystyrene triblock copolymer (CAS Reg. No. 66070-58-4) having a polystyrene content of 33 weight percent, available as KRATON G1651 from Kraton Polymers. |
| SEBS G1657 | Polystyrene-poly(ethylene-butylene)-polystyrene triblock copolymer (CAS Reg. No. 66070-58-4) having a polystyrene content of 13 weight percent, available as KRATON G1657 from Kraton Polymers. |
| SEBS Tuftec | Polystyrene-poly(ethylene-butylene)-polystyrene triblock copolymer (CAS Reg. No. 66070-58-4) having a polystyrene content of 67 weight percent, available as TUFTEC H1043 from Asahi Polymers. |
| HIPS | High impact polystyrene (CAS Reg. No. 9003-55-8) available as GPHIPS from Polychem Industries Ltd, India |
| SEP | Polystyrene-poly(ethylene-propylene) diblock copolymer having a polystyrene content of 37 weight percent, available as KRATON G1701 from Kraton Polymers. |
| SBS | Polystyrene-butadiene-polystyrene triblock copolymer having a polystyrene content of 31 weight percent, available as KRATON D1101 from Kraton Polymers |
| Metablen SRK2000 | Core-shell impact modifier available as Metablen SRK2000 from Mitsubishi |
| J4368 | Polymeric compatibilizer having an epoxy content about 3,500 meq/kg, a number average molecular weight of 6,800 grams/mole, and an average of 24 pendant epoxy groups per molecule; available as Joncryl 4368 from Johnson Polymers |
| BPADP | Bisphenol A bis(diphenyl phosphate) (CAS Reg. No. 5945-33-5), available as Fyrolflex BDP from Supresta |
| CCB | Conductive carbon black available as Ketjen black EC 600JD from Akzo Nobel |
| Functionalizing agent | Citric acid (CAS Reg. No. 77-92-9) from SD Fine Chemicals Ltd |
| Stabilizer | A blend of hindered phenol and phosphite stabilizers |
| Cuprous Iodide | Cuprous iodide (CAS Reg. No. 7681-65-4) having a minimum purity of 99%, obtained from S.D. Fine Chemicals |
| Potassium Iodide | Potassium iodide (CAS Reg. No. 7681-11-0) having a minimum purity of 99 percent, obtained from Ranbaxy fine chemicals |
| Ex. 1 CSP | Core-shell particle as prepared in Example 1 |
| Ex. 4 CSP | Core-shell particle as prepared in Example 4 |

Examples 9-11 and Comparative Examples 1-9 illustrate the effects of impact modifier type and amount on the physical properties of poly(arylene ether) blends. Compositions are summarized in Table 11.

The compositions were compounded using a co-rotating 25-millimeter twin-screw extruder with a length-to-screw diameter ratio, L/D, of about 40:1. The extruder included ten barrels having temperatures, from upstream to downstream, of 150, 220, 240, 255, 255, 265, 265, 275, 275, 275, and 280° C. (die). All components were added to the feedthroat of the extruder. The screw rotation rate was 300 rpm and the throughput was about 15 kilograms per hour. Tensile bars and impact specimens were molded on a 60 ton injection molding machine using barrel temperatures of about 275-300° C. and a mold temperature of 80° C.

Property values are summarized in Table 11. Tensile modulus (expressed in megapascals), tensile stress values at yield and break (expressed in megapascals), and tensile strain values at yield and break (expressed in percent) were measured at 23° C. according to ISO 527. Notched Izod impact strengths (expressed in kilojoules per meter-squared) were measured at 23° C. and −40° C. according to ISO 180. Multi-axial impact (MAI) total energy, expressed in joules, was measured at 23° C. according to ISO 6603-2. In the Table 11 row for MAI failure mode, "B" signifies brittle failure, and "DSC" signifies ductile support crack. All physical property values are expressed as mean±standard deviation based on testing of five samples per composition.

The properties smoke density at 4 minutes (Ds_4 min in Table 11; unitless), smoke density at 20 minutes (Ds_20 min; unitless), maximum smoke density (Ds_max; unitless), time to maximum smoke density (Time to Ds_max; expressed in minutes), and smoke density at 20 minutes (Ds_20 min; unitless) were measured according to ASTM E 662-2005 using an NIST smoke density chamber (chamber dimensions: 914 millimeters×914 millimeters×610 millimeters) from Newport Scientific, U.S.A. Square plaques 76.2 millimeters× 76.2 millimeters in dimension with a thickness of 1.5 or 3.2 millimeters were used for the measurements. The heating source is calibrated using a radiometer to provide a heat flux of 2.5 watts per centimeter$^2$. The samples were conditioned at 23° C. and 50% relative humidity for 48 hours prior to testing. Typically, the measurements were done in "flaming mode" for 20 minutes and the maximum smoke density values obtained from three independent measurements were averaged and reported as Ds_max.

The results show that the compositions with the core-shell particle exhibit better room temperature and low temperature notched Izod impact strengths than the corresponding comparative examples with SEBS G1650, SEBS Tuftec, or a blend thereof (see Example 9 versus Comparative Examples 2 and 3; Example 10 versus Comparative Examples 4, 5, and 6; and Example 11 versus Comparative Examples 7, 8, and 9). The compositions with the core-shell particles also exhibit lower smoke densities than the corresponding comparative examples with SEBS G1650, SEBS Tuftec, or a blend thereof (see Example 9 versus Comparative Example 2; Example 10 versus Comparative Examples 4 and 5; and Example 11 versus Comparative Examples 7, 8, and 9).

TABLE 11

|  | C. Ex. 1 | Ex. 9 | C. Ex. 2 | C. Ex. 3 |
|---|---|---|---|---|
| Compositions | | | | |
| 0.33 IV PPE | 100 | 95 | 95 | 95 |
| Ex. 1 CSP | 0 | 5 | 0 | 0 |
| SEBS G1650 | 0 | 0 | 5 | 0 |
| SEBS Tuftec | 0 | 0 | 0 | 5 |
| Properties | | | | |
| Tensile modulus (MPa) | 2532 ± 46 | 2459 ± 65 | 2425 ± 96 | 2489 ± 10 |
| Tensile stress at yield (MPa) | 70.4 ± 4.8 | 69.6 ± 0.3 | 72.3 ± 0.2 | 75.3 ± 0.9 |
| Tensile strain at yield (%) | 4.5 ± 0.8 | 5.8 ± 0.2 | 5.8 ± 0.3 | 5.8 ± 0.3 |
| Tensile stress at break (MPa) | 67.1 ± 4.8 | 52.8 ± 0.5 | 61.6 ± 7.9 | 54.3 ± 1.7 |
| Tensile strain at break (%) | 4.6 ± 0.9 | 11.7 ± 0.8 | 7.9 ± 1.9 | 8.6 ± 1.1 |
| Notched Izod at 23° C. (kJ/m$^2$) | 1.9 ± 0.2 | 5.7 ± 0.9 | 2.6 ± 0.8 | 1.9 ± 0.1 |
| Notched Izod at −40° C. (kJ/m$^2$) | 2.1 ± 0.5 | 4.5 ± 0.3 | 3.0 ± 0.7 | 2.2 ± 0.1 |
| MAI total energy (J) | 3.2 ± 0.6 | 28.1 ± 4.8 | 73.3 ± 3.9 | 3.5 ± 0.9 |
| MAI failure mode | B | DSC | DSC | B |
| Ds_4 min, 1.5 mm | — | — | — | — |
| Ds_max, 1.5 mm | — | — | — | — |
| Time to Ds_max, 1.5 mm | — | — | — | — |
| Ds_20 min, 1.5 mm | — | — | — | — |
| Ds_4 min, 3.2 mm | — | 121 ± 23 | 170 ± 28 | — |
| Ds_max, 3.2 mm | — | 236 ± 37 | 363 ± 18 | — |
| Time to Ds_max, 3.2 mm | — | 7.6 ± 1.9 | 15.8 ± 6.0 | — |
| Ds_20 min, 3.2 mm | — | 203 ± 40 | 336 ± 21 | — |
|  | Ex. 10 | C. Ex. 4 | C. Ex. 5 | C. Ex. 6 |
| Compositions | | | | |
| 0.33 IV PPE | 90 | 90 | 90 | 90 |
| Ex. 1 CSP | 10 | 0 | 0 | 0 |
| SEBS G1650 | 0 | 10 | 0 | 5 |
| SEBS Tuftec | 0 | 0 | 10 | 5 |
| Properties | | | | |
| Tensile modulus (MPa) | 2258 ± 88 | 2321 ± 57 | 2525 ± 14 | 2379 ± 1 |
| Tensile stress at yield (MPa) | 63.2 ± 0.2 | 68.9 ± 1.1 | 75.3 ± 1.0 | 71.0 ± 0.4 |
| Tensile strain at yield (%) | 5.4 ± 0.2 | 5.9 ± 0.3 | 5.8 ± 0.2 | 5.6 ± 0.1 |
| Tensile stress at break (MPa) | 56.0 ± 1.8 | 50.5 ± 1.6 | 52.7 ± 0.7 | 56.3 ± 10.5 |

TABLE 11-continued

|  | Ex. 11 | C. Ex. 7 | C. Ex. 8 | C. Ex. 9 |
|---|---|---|---|---|
| Tensile strain at break (%) | 7.8 ± 0.9 | 13.2 ± 0.6 | 11.1 ± 0.4 | 9.4 ± 2.6 |
| Notched Izod at 23° C. (kJ/m$^2$) | 17.2 ± 0.5 | 6.1 ± 0.5 | 2.0 ± 0.2 | 4.4 ± 0.4 |
| Notched Izod at −40° C. (kJ/m$^2$) | 14.5 ± 0.8 | 6.1 ± 0.3 | 2.1 ± 0.3 | 4.0 ± 0.7 |
| MAI total energy (J) | 47.9 ± 18.6 | 64.9 ± 5.7 | 3.9 ± 1.7 | 66.3 ± 14.0 |
| MAI failure mode | DSC | DSC | B | B |
| Ds_4 min, 1.5 mm | — | — | — | — |
| Ds_max, 1.5 mm | — | — | — | — |
| Time to Ds_max, 1.5 mm | — | — | — | — |
| Ds_20 min, 1.5 mm | — | — | — | — |
| Ds_4 min, 3.2 mm | 118 ± 13 | 305 ± 18 | 373 ± 45 | — |
| Ds_max, 3.2 mm | 208 ± 24 | 398 ± 2 | 472 ± 50 | — |
| Time to Ds_max, 3.2 mm | 8.3 ± 0.4 | 7.3 ± 1.1 | 5.9 ± 0.6 | — |
| Ds_20 min, 3.2 mm | 190 ± 12 | 338 ± 19 | 331 ± 55 | — |

|  | Ex. 11 | C. Ex. 7 | C. Ex. 8 | C. Ex. 9 |
|---|---|---|---|---|
| Compositions | | | | |
| 0.33 IV PPE | 80 | 80 | 80 | 80 |
| Ex. 1 CSP | 20 | 0 | 0 | 0 |
| SEBS G1650 | 0 | 20 | 0 | 10 |
| SEBS Tuftec | 0 | 0 | 20 | 10 |
| Properties | | | | |
| Tensile modulus (MPa) | 1933 ± 51 | 2000 ± 89 | 2141 ± 9 | 2113 ± 26 |
| Tensile stress at yield (MPa) | 51.2 ± 0.2 | 57.6 ± 0.3 | 62.9 ± 0.3 | 61.9 ± 0.3 |
| Tensile strain at yield (%) | 4.9 ± 0.4 | 5.8 ± 0.2 | 5.5 ± 0.2 | 5.7 ± 0.3 |
| Tensile stress at break (MPa) | 45.1 ± 0.9 | 43.5 ± 1.3 | 46.4 ± 0.3 | 43.9 ± 1.3 |
| Tensile strain at break (%) | 11.7 ± 1.4 | 12.5 ± 2.4 | 13.5 ± 1.9 | 15.7 ± 2.6 |
| Notched Izod at 23° C. (kJ/m$^2$) | 23.9 ± 0.9 | 17.0 ± 1.2 | 7.2 ± 0.6 | 8.1 ± 1.0 |
| Notched Izod at −40° C. (kJ/m$^2$) | 19.1 ± 0.6 | 9.7 ± 0.9 | 5.6 ± 0.6 | 7.1 ± 0.9 |
| MAI total energy (J) | 45.2 ± 10.8 | 66.5 ± 2.8 | 68.6 ± 4.6 | 70.7 ± 10.1 |
| MAI failure mode | DSC | DSC | DSC | B |
| Ds_4 min, 1.5 mm | 61.3 ± 35.1 | 225 ± 53 | 303 ± 30 | 300 ± 60 |
| Ds_max, 1.5 mm | 195.3 ± 21.1 | 260 ± 34 | 321 ± 21 | 311 ± 53 |
| Time to Ds_max, 1.5 mm | 12.9 ± 4.7 | 7.1 ± 2.1 | 6.1 ± 0.6 | 6.5 ± 1.6 |
| Ds_20 min, 1.5 mm | 173.2 ± 20.5 | 176 ± 17.5 | 216 ± 33 | 201 ± 9 |
| Ds_4 min, 3.2 mm | 132 ± 63 | 334 ± 14 | 420 ± 4 | 459 ± 79 |
| Ds_max, 3.2 mm | 319 ± 34 | 384 ± 31 | 456 ± 7 | 563 ± 143 |
| Time to Ds_max, 3.2 mm | 11.5 ± 1.6 | 7.2 ± 2.3 | 8.2 ± 4.5 | 6.0 ± 0.7 |
| Ds_20 min, 3.2 mm | 274 ± 20 | 346 ± 36 | 390 ± 19 | 332 |

Examples 13 and 14, Comparative Examples 10-19

These examples illustrate the use of the core-shell particles in compositions comprising poly(arylene ether) and rubber-modified polystyrene, and they provide comparisons of the core-shell particles to other impact modifiers in these compositions.

The compositions, which are summarized in Table 12, were prepared and molded according to the procedures described above. Physical properties, also summarized in Table 12, were measured as described above, and the following additional properties were determined. Total deformation, expressed in millimeters, was measured at 23° C. according to ISO 6603-2. Heat deflection temperature (HDT) was measured at 1.8 megapascals load according to ASTM D 648-06, "Standard Test Method for Deflection Temperature of Plastics Under Flexural Load in the Edgewise Position". Melt volume rate ("MVR") was measured at 310° C. and 10 kilogram load according to ISO 1133. Flammability testing was conducted according to UL 94, "Test for Flammability of Plastic Materials for Parts in Devices and Appliances", Fifth Edition (1996), Vertical Burning Test.

The results for samples with 85 weight percent poly(arylene ether) and 5 weight percent rubber-modified polystyrene and 5 weight percent elastomer, presented in the first part of Table 12, show that the Example 13 composition with the core-shell particle exhibits an excellent balance of properties. In particular, its 23° C. and −40° C. notched Izod impact strength values were among the highest of the samples tested, while most other properties are comparable to those associated with other elastomers. The Example 13 composition with core-shell particles exhibited an excellent balance of properties.

The results for samples with 70 weight percent poly(arylene ether), 10 weight percent rubber-modified polystyrene, and 20 weight percent elastomer, presented in the continuation of Table 12, show that although all samples failed the UL 94 Vertical Burning Test, the Example 14 composition with the core-shell particles exhibited an otherwise excellent balance of properties.

TABLE 12

|  | C. Ex. 10 | Ex. 13 | C. Ex. 11 | C. Ex. 12 | C. Ex. 13 | C. Ex. 14 |
|---|---|---|---|---|---|---|
| Compositions | | | | | | |
| 0.41 IV PPE | 85 | 85 | 85 | 85 | 85 | 85 |
| HIPS | 10 | 10 | 10 | 10 | 10 | 10 |
| SBS | 5 | 0 | 0 | 0 | 0 | 0 |

TABLE 12-continued

|  |  |  |  |  |  |  |
|---|---|---|---|---|---|---|
| Ex. 4 CSP | 0 | 5 | 0 | 0 | 0 | 0 |
| SEBS G1650 | 0 | 0 | 5 | 0 | 0 | 0 |
| SEBS G1651 | 0 | 0 | 0 | 5 | 0 | 0 |
| SEBS G1657 | 0 | 0 | 0 | 0 | 5 | 0 |
| SEBS Tuftec | 0 | 0 | 0 | 0 | 0 | 5 |
| Properties |  |  |  |  |  |  |
| Tensile modulus (MPA) | 2406 ± 40 | 2385 ± 43 | 2409 ± 19 | 2400 ± 39 | 2577 ± 38 | 2302 ± 30 |
| Tensile elongation at break (%) | 12.1 ± 2.4 | 13.4 ± 2.3 | 12.2 ± 3.1 | 14.9 ± 1.8 | 17.0 ± 1.0 | 23.5 ± 8.1 |
| Notched Izod at 23° C. (kJ/m$^2$) | 9.1 | 13.1 | 6.5 | 13.0 | 4.8 | 18.3 |
| Notched Izod at −40° C. (kJ/m$^2$) | 5.0 | 10.1 | 4.7 | 7.4 | 4.1 | 10.3 |
| Total deformation (mm) | 16.6 ± 2.4 | 19.8 ± 0.4 | 20.1 ± 1.4 | 13.0 ± 5.1 | 13.9 ± 7.9 | 19.6 ± 1.3 |
| MAI total energy (J) | 37.6 ± 8.3 | 72.7 ± 23.6 | 93.3 ± 10.3 | 49.4 ± 28.8 | 44.8 ± 37.7 | 56.9 ± 30.9 |
| HDT at 1.8 MPa (° C.) | 158.4 | 162.4 | 162.4 | 165.0 | 159.7 | 163.4 |
| MVR at 310° C. and 10 kg (mL/10 min) | 25.1 | 27.0 | 33.6 | 36.2 | 34.3 | 24.0 |
| UL 94 rating at 2 mm | failed | V1 | V1 | V1 | V1 | V1 |

|  | C. Ex. 15 | Ex. 14 | C. Ex. 16 | C. Ex. 17 | C. Ex. 18 | C.Ex. 19 |
|---|---|---|---|---|---|---|
| Compositions |  |  |  |  |  |  |
| 0.41 IV PPE | 70 | 70 | 70 | 70 | 70 | 70 |
| HIPS | 10 | 10 | 10 | 10 | 10 | 10 |
| SBS | 20 | 0 | 0 | 0 | 0 | 0 |
| Ex. 4 CSP | 0 | 20 | 0 | 0 | 0 | 0 |
| SEBS G1650 | 0 | 0 | 20 | 0 | 0 | 0 |
| SEBS G1651 | 0 | 0 | 0 | 20 | 0 | 0 |
| SEBS G1657 | 0 | 0 | 0 | 0 | 20 | 0 |
| SEBS Tuftec | 0 | 0 | 0 | 0 | 0 | 20 |
| Properties |  |  |  |  |  |  |
| Tensile modulus (MPA) | 1876 ± 25 | 2001 ± 28 | 1861 ± 18 | 1181 ± 38 | 2355 ± 7 | 1753 ± 31 |
| Tensile elongation at break (%) | 24.2 ± 7.6 | 16.4 ± 4.7 | 25.8 ± 8.2 | 33.5 ± 8.0 | 8.0 ± 0.3 | 27.8 ± 7.3 |
| Notched Izod at 23° C. (kJ/m$^2$) | 9.31 | 22.59 | 31.20 | 59.65 | 6.08 | 36.18 |
| Notched Izod at −40° C. (kJ/m$^2$) | 5.52 | 18.70 | 14.38 | 11.13 | 3.91 | 26.92 |
| Total deformation (mm) | 17.7 ± 0.9 | 19.9 ± 1.6 | 19.9 ± 1.1 | 16.1 ± 2.4 | 20.2 ± 2.8 | 22.0 ± 1.6 |
| MAI total energy (J) | 59.2 ± 22.1 | 47.9 ± 13.9 | 87.2 ± 11.5 | 28.9 ± 24.2 | 67.6 ± 31.1 | 91.7 ± 6.9 |
| HDT at 1.8 MPa (° C.) | 142.7 | 147.7 | 150.9 | 101.4 | 143.2 | 148.9 |
| MVR at 310° C. and 10 kg (mL/10 min) | 8.80 | 18.70 | 48.60 | 165.60 | 70.00 | 19.20 |
| UL 94 rating at 2 mm | failed | failed | failed | failed | failed | failed |

Example 15 and Comparative Example 20

These examples illustrate the substitution of core-shell particles for hydrogenated block copolymer in a poly(arylene ether)/polyamide composition. Compositions are summarized in Table 13, where component amounts are given in parts by weight.

The compositions were compounded in a 25-millimeter co-rotating twin-screw extruder run at about 20 kilograms per hour at a screw rotation rate of 300-400 rotations per minute and an applied vacuum of 25.4-76.2 centimeters of mercury (10-30 inches of mercury). The extruder zone temperatures from upstream to downstream were 80° C., 270° C., 280° C., 300° C., 300° C., 300° C., 300° C., 300° C., 300° C., 310° C., and 310° C. (die). All components except the polyamides were added to the feedthroat of the extruder; the polyamides were added via a side feeder in zone 5 of 10. The extrudate was cooled and chopped into pellets. The pellets were injection molded at 300° C. to form tensile bars.

The results in Table 13 show that substitution of core-shell particles for a blend of polystyrene-poly(ethylene-propylene) and polystyrene-poly(ethylene-butylene)-polystyrene provides a modest improvement in tensile modulus, but a decrease in tensile elongation.

TABLE 13

|  | Ex. 11 | C. Ex. 7 |
|---|---|---|
| COMPOSITIONS |  |  |
| 0.41 IV PPE | 34.81 | 34.02 |
| SEP | 8.00 | 0 |
| SEBS G1651 | 7.00 | 0 |
| Ex. 1 CSP | 0 | 15.00 |
| Citric acid | 0.70 | 0.70 |
| Stabilizers | 0.41 | 0.41 |
| PA66 | 38.90 | 39.91 |
| PA6 | 10.18 | 9.97 |
| PROPERTIES |  |  |
| Tensile modulus (GPa) | 1.5 | 1.8 |
| Tensile strain at break (%) | 27.1 | 11.8 |

Examples 16-18, Comparative Examples 21-23

These examples illustrate the substitution of core-shell particles for some or all of the hydrogenated block copolymer in a poly(arylene ether)-polyester composition. Compositions are summarized in Table 14, where component amounts are given in parts by weight. The compositions were compounded in a 25-millimeter co-rotating twin-screw extruder run at about 20 kilograms per hour at a screw rotation rate of 300-400 rotations per minute and an applied vacuum of 25.4-76.2 centimeters of mercury (10-30 inches of mercury). The extruder zone temperatures from upstream to downstream were 80° C., 270° C., 280° C., 275° C., 275° C., 275° C., 275° C., 275° C., 275° C., 275° C., and 280° C. (die). All components except the polyester (PBT) and compatibilizer (J4368) were added to the feedthroat of the extruder; the polyester and compatibilizer were added via a side feeder in zone 5 of 10. The extrudate was cooled and chopped into pellets. The pellets were injection molded at 300° C. to form test articles.

In Table 14, "Viscosity at 1500 s$^{-1}$, 280° C." refers to the viscosity of the composition measured at a shear rate of 1500 sec$^{-1}$ and a temperature of 280° C. Viscosity was measured using a capillary viscometer (Rheograph 6000). In these measurements, polymer melt is forced through a die and the melt pressure exerted on the barrel surface is measured by a pressure transducer. The instrument calculates the viscosity using this melt pressure data.

The property values in Table 14 show that partial replacement of the hydrogenated block copolymer with core-shell particles yield a significant improvement (reduction) in smoke density at 4 minutes and a significant improvement (reduction) in melt viscosity (Example 16 versus Comparative Example 21) while maintaining tensile strength, tensile elongation, and heat deflection temperature. However, these improvement is obtained at the cost of reduced impact strength. Transmission electron microscopy of samples obtained from Comparative Example 21 and Example 16 have a morphology comprising a polyester continuous phase and a poly(arylene ether) discrete phase. In the Example 16 sample, the poly(arylene ether) discrete phase comprises the core-shell particles.

TABLE 14

|  | C. Ex. 21 | Ex. 16 | C. Ex. 22 | Ex. 17 | C. Ex. 23 | Ex. 18 |
|---|---|---|---|---|---|---|
| COMPOSITIONS | | | | | | |
| 0.41 IV PPE | 17.85 | 17.85 | 17.85 | 17.85 | 17.85 | 17.85 |
| SEBS G1651 | 7.00 | 7.00 | 14.00 | 0 | 8.00 | 0 |
| SEP | 7.00 | 0 | 0 | 0 | 0 | 0 |
| Ex. 1 CSP | 0 | 7.00 | 0 | 14.00 | 0 | 8.00 |
| Citric acid | 0.70 | 0.70 | 0.70 | 0.70 | 0.70 | 0.70 |
| Stabilizers | 0.45 | 0.45 | 0.45 | 0.45 | 0.45 | 0.45 |
| PBT195 | 66.00 | 66.00 | 66.00 | 66.00 | 72.00 | 72.00 |
| J4368 | 1.00 | 1.00 | 1.00 | 1.00 | 1.00 | 1.00 |
| PROPERTIES | | | | | | |
| Tensile modulus (GPa) | 2.15 | 2.20 | 2.10 | 2.13 | 2.30 | 2.42 |
| Tensile strain at break (%) | 18 | 16 | 24 | 4.7 | 15 | 5.6 |
| Notched Izod at 23° C. (kJ/m$^2$) | 9.3 | 5.5 | 11.9 | 4.0 | 7.9 | 4.4 |
| Notched Izod at −40° C. (kJ/m$^2$) | 8.6 | 6.1 | 11.9 | 4.9 | 7.8 | 5.2 |
| MAI total energy (J) | 52 | 9 | — | — | — | — |
| Total deformation (mm) | 22 | 9 | — | — | — | — |
| HDT at 1.8 MPa (° C.) | 162 | 164 | — | — | — | — |
| Viscosity at 1500 s$^{-1}$, 280° C. | 175 | 96 | 175 | 96 | 160 | 97 |
| Ds_4 min, 3.2 mm | 394 | 264 | 391 | 398 | 392 | 368 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of forming a core-shell particle, comprising:
    forming a polyorganosiloxane core by polymerizing a polydialkylsiloxane precursor in the presence of water and a first emulsifying agent and in the absence of a tri- or tetraalkoxysilane;
    crosslinking the polyorganosiloxane core by reacting a tri- or tetraalkoxysilane with the polyorganosiloxane core;
    forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and
    forming a core-shell particle by polymerizing a shell-forming monomer in the presence of the graftlinker functionalized crosslinked polysiloxane core and a second emulsifying agent different from the first emulsifying agent;
    wherein the shell-forming monomer comprises an alkenyl aromatic compound;
    wherein the core-shell particle has a mean diameter of 220 to 300 nanometers.

2. The method of claim 1, wherein the polymerizing a polydialkylsiloxane precursor is conducted in the absence of a graftlinking agent.

3. The method of claim 1, wherein the crosslinking the polyorganosiloxane core is conducted in the absence of a graftlinking agent.

4. The method of claim 1, wherein the polydialkylsiloxane precursor comprises a cyclic dimethylsiloxane oligomer or polymer comprising 4 to 12 dimethylsiloxane units.

5. The method of claim 1, wherein the polydialkylsiloxane precursor comprises octamethylcyclotetrasiloxane.

6. The method of claim 1, wherein the polydialkylsiloxane precursor is used in an amount of about 50 to 90 weight percent based on the total weight of the polydialkylsiloxane precursor, the tri- or tetraalkoxysilane, the graftlinking agent, and the shell-forming monomer.

7. The method of claim 1, wherein the first emulsifying agent comprises dodecylbenzenesulfonic acid.

8. The method of claim 1, wherein the first emulsifying agent is used in an amount of 0.5 to 1.5 weight percent based on the total weight of the water and the polydialkylsiloxane precursor.

9. The method of claim 1, wherein the water is used in an amount of 40 to 90 weight percent based on the total weight of the polydialkylsiloxane precursor, the tri- or tetraalkoxysilane, the graftlinking agent, the shell-forming monomer, and the water.

10. The method of claim 1, wherein the tri- or tetraalkoxysilane reacted with the polyorganosiloxane core is selected from the group consisting of tetraethyl orthosilicate, methyltrimethoxysilane, methyltriethoxysilane, tetramethoxysilane, tetrapropoxysilane, and mixtures thereof.

11. The method of claim 1, wherein the tri- or tetraalkoxysilane reacted with the polyorganosiloxane core comprises tetraethyl orthosilicate.

12. The method of claim 1, wherein the tri- or tetraalkoxysilane reacted with the polyorganosiloxane core is used in an amount of 2 to 30 weight percent based on the total weight of the polydialkylsiloxane precursor, and the tri- or tetraalkoxysilane.

13. The method of claim 1, wherein the graftlinking agent is selected from the group consisting of methacryloxypropyltrimethoxysilane, methacryloxypropyltriethoxysilane, methacryloxypropylmethyldimethoxysilane, 3-mercaptopropyltrimethoxysilane, vinyltrimethoxysilane, vinyltriethoxysilane, vinyltris(2-methoxyethoxy)silane, and mixtures thereof.

14. The method of claim 1, wherein the graftlinking agent comprises methacryloxypropyltrimethoxysilane.

15. The method of claim 1, wherein the graftlinking agent is used in an amount of 1 to 7.5 weight percent based on the total weight of the polydialkylsiloxane precursor, the tri- or tetraalkoxysilane, the graftlinking agent, and the shell-forming monomer.

16. The method of claim 1, wherein the alkenyl aromatic monomer comprises styrene.

17. The method of claim 1, wherein the shell forming monomer further comprises an acrylate monomer, acrylonitrile, methacrylonitrile, or a mixture thereof.

18. The method of claim 1, wherein the shell-forming monomer further comprises a functionalized monomer comprising a carbon-carbon double or triple bond and at least one other functional group selected from the group consisting of hydroxy, glycidyl, and nitrile.

19. The method of claim 18, wherein the functionalized monomer is selected from the group consisting of glycidyl methacrylate, 2-hydroxyethyl methacrylate, acrylonitrile, and mixtures thereof.

20. The method of claim 1, wherein the shell-forming monomer is used in an amount of 10 to 50 weight percent based on the total weight of the polydialkylsiloxane precursor, the tri- or tetraalkoxysilane, the graftlinking agent, and the shell-forming monomer.

21. The method of claim 1, wherein the second emulsifying agent comprises sodium dodecylbenzenesulfonate.

22. The method of claim 1, wherein the second emulsifying agent is used in an amount of 0.2 to 5 weight percent based on the weight of the shell-forming monomer.

23. The method of claim 1, wherein the core-shell particle comprises a core having a mean diameter of 200 to 280 nanometers.

24. The method of claim 1, wherein the core shell particle has a gel content of 80 to 95 percent measured after 48 hours immersion in toluene at 23° C.

25. The method of claim 1, wherein the core shell particle exhibits a first glass transition temperature of −134 to −124° C. and a second glass transition temperature of 103 to 113° C., measured by differential scanning calorimetry using a rate of temperature change of 20° C. per minute.

26. The method of claim 1, wherein the core shell particle exhibits at least 90 weight percent residue at 300° C. and at least 10 weight percent residue at 600° C. when analyzed by thermogravimetric analysis using an air atmosphere and a rate of temperature change of 20° C. per minute.

27. The method of claim 1,
wherein the polydialkylsiloxane precursor comprises octamethylcyclotetrasiloxane;
wherein the tri- or tetraalkoxysilane reacted with the polyorganosiloxane core comprises tetraethyl orthosilicate;
wherein the first emulsifying agent comprises dodecylbenzenesulfonic acid;
wherein the graftlinking agent comprises methacryloxypropyltrimethoxysilane;
wherein the alkenyl aromatic compound comprises styrene; and
wherein the core-shell particle has a gel content of 85 to 95 percent measured after 48 hours immersion in toluene at 23° C.

28. A method of forming a core-shell particle, comprising:
forming a polyorganosiloxane core by polymerizing a polydialkylsiloxane precursor in the presence of water and a first emulsifying agent;
crosslinking the polyorganosiloxane core by reacting a tri- or tetraalkoxysilane with the polyorganosiloxane core;
forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and
forming a core-shell particle by polymerizing a shell-forming monomer in the presence of the graftlinker functionalized crosslinked polysiloxane core and a second emulsifying agent different from the first emulsifying agent;
wherein the shell-forming monomer comprises an alkenyl aromatic compound; wherein the shell-forming monomer further comprises a functionalized monomer comprising a carbon-carbon double or triple bond and at least one other functional group selected from the group consisting of hydroxy, glycidyl, and nitrile; and wherein the functionalized monomer comprises glycidyl methacrylate;
wherein the core-shell particle has a mean diameter of 220 to 300 nanometers.

29. A method of forming a core-shell particle, comprising:
forming a polyorganosiloxane core by polymerizing a polydialkylsiloxane precursor in the presence of water and a first emulsifying agent; wherein the polydialkylsiloxane precursor comprises octamethylcyclotetrasiloxane; wherein the first emulsifying agent comprises dodecylbenzenesulfonic acid;

crosslinking the polyorganosiloxane core by reacting a tri- or tetraalkoxysilane with the polyorganosiloxane core; wherein the tri- or tetraalkoxysilane comprises tetraethyl orthosilicate;

forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; wherein the graftlinking agent comprises methacryloxypropyltrimethoxysilane; and forming a core-shell particle by polymerizing a shell-forming monomer in the presence of the graftlinker functionalized crosslinked polysiloxane core and a second emulsifying agent different from the first emulsifying agent; wherein the shell-forming monomer comprises an alkenyl aromatic compound; wherein the polymerizing a shell forming monomer comprises copolymerizing styrene and glycidyl methacrylate;

wherein the core-shell particle has a mean diameter of 220 to 300 nanometers; and wherein the core-shell particle has a gel content of 85 to 95 percent measured after 48 hours immersion in toluene at 23° C.

30. A core-shell particle, comprising:
a crosslinked polydimethylsiloxane core;
a shell comprising a styrene homopolymer or copolymer; and
covalent linkages between the crosslinked polydimethylsiloxane core and the shell;
wherein the core-shell particle has a mean diameter of 220 to 300 nanometers; and
wherein the core-shell particle has a gel content of 85 to 95 percent measured after 48 hours immersion in toluene at 23° C.

31. The core-shell particle of claim 30, wherein the crosslinked polydimethylsiloxane core has a mean diameter of 200 to 280 nanometers.

32. A core shell particle, comprising:
a crosslinked polydimethylsiloxane core; wherein the crosslinked polydimethylsiloxane core is the product of copolymerizing reactants comprising octamethylcyclotetrasiloxane and tetraethyl orthosilicate;
a shell comprising a styrene homopolymer or copolymer; wherein the shell is a homopolymer of styrene or a copolymer of styrene and glycidyl methacrylate; and
covalent linkages between the crosslinked polydimethylsiloxane core and the shell; wherein the covalent linkages are reaction products of a graftlinking agent comprising methacryloxypropyltrimethoxysilane;
wherein the core-shell particle has a mean diameter of 240 to 270 nanometers;
wherein the core-shell particle has a gel content of 85 to 95 percent measured after 48 hours immersion in toluene at 23° C.

33. A thermoplastic composition, comprising:
a polymer; and
a core-shell particle, comprising
a crosslinked polydimethylsiloxane core;
a shell comprising a styrene homopolymer or copolymer; and
covalent linkages between the crosslinked polydimethylsiloxane core and the shell;
wherein the core-shell particle has a mean diameter of 220 to 300 nanometers; and
wherein the core-shell particle has a gel content of 85 to 95 percent measured after 48 hours immersion in toluene at 23° C.

34. The thermoplastic composition of claim 33, wherein the crosslinked polydimethylsiloxane core has a mean diameter of 200 to 280 nanometers.

35. The thermoplastic composition of claim 33, comprising 5 to 20 weight percent of the core-shell particle, based on the total weight of the composition.

36. The thermoplastic composition of claim 33, wherein the polymer comprises a poly(arylene ether).

37. The thermoplastic composition of claim 33, wherein the polymer comprises a poly(arylene ether) and at least one additional polymer selected from the group consisting of polystyrenes, rubber-modified polystyrenes, unhydrogenated or hydrogenated block copolymers of an alkenyl aromatic compound and a conjugated diene, polyamides, polyimides, polyethers, polyetherimides, polyolefins, and polyesters.

38. The method of claim 1, wherein the shell-forming monomer further comprises glycidyl methacrylate.

39. The core-shell particle of claim 30, wherein the shell comprises the styrene copolymer, and wherein the styrene copolymer comprises a copolymer of styrene and glycidyl methacrylate.

40. The thermoplastic composition of claim 33, wherein the shell comprises the styrene copolymer, and wherein the styrene copolymer comprises a copolymer of styrene and glycidyl methacrylate.

* * * * *